(12) United States Patent
Boyle et al.

(10) Patent No.: US 9,058,280 B1
(45) Date of Patent: Jun. 16, 2015

(54) HYBRID DRIVE MIGRATING DATA FROM DISK TO NON-VOLATILE SEMICONDUCTOR MEMORY BASED ON ACCUMULATED ACCESS TIME

(75) Inventors: William B. Boyle, Lake Forest, CA (US); Mei-Man L. Syu, Fremont, CA (US); Virgil V. Wilkins, Perris, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 274 days.

(21) Appl. No.: 13/105,800

(22) Filed: May 11, 2011

Related U.S. Application Data

(60) Provisional application No. 61/373,753, filed on Aug. 13, 2010.

(51) Int. Cl.
*G06F 12/08* (2006.01)

(52) U.S. Cl.
CPC ........ *G06F 12/0866* (2013.01); *G06F 12/0868* (2013.01); *G06F 2212/217* (2013.01)

(58) Field of Classification Search
CPC .............. G06F 3/0679; G06F 12/0246; G06F 2212/7211; G06F 12/0866; G06F 12/0868; G06F 2212/1024; G06F 2212/1036; G06F 2212/2022; G06F 2212/217
USPC ........................................................ 711/103
See application file for complete search history.

(56) References Cited

U.S. PATENT DOCUMENTS

| | | |
|---|---|---|
| 5,333,138 A | 7/1994 | Richards et al. |
| 5,420,998 A | 5/1995 | Horning |
| 5,457,786 A | 10/1995 | Roush |
| 5,471,604 A | 11/1995 | Hasbun et al. |
| 5,581,785 A | 12/1996 | Nakamura et al. |
| 5,586,291 A | 12/1996 | Lasker et al. |
| 5,636,355 A | 6/1997 | Ramakrishnan et al. |
| 5,682,273 A | 10/1997 | Hetzler |
| 5,905,901 A | 5/1999 | Klein |
| 5,913,067 A | 6/1999 | Klein |
| 5,954,820 A | 9/1999 | Hetzler |
| 6,044,439 A | 3/2000 | Ballard et al. |
| 6,115,200 A | 9/2000 | Allen et al. |
| 6,236,527 B1 | 5/2001 | Uchiike et al. |
| 6,275,949 B1 | 8/2001 | Watanabe |
| 6,295,577 B1 | 9/2001 | Anderson et al. |
| 6,408,357 B1 | 6/2002 | Hanmann et al. |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Charles Rones
*Assistant Examiner* — Andrew Russell

(57) ABSTRACT

A hybrid drive is disclosed comprising a head actuated over a disk comprising a plurality of data tracks, and a non-volatile semiconductor memory (NVSM). An access command is received from a host, the access command identifying at least one target logical block address (LBA). When the target LBA is mapped to a target data track on the disk, the head is positioned over the target data track and an accumulated access time is updated for the target LBA. The accumulated access time is compared to a first threshold, and the target LBA is migrated to the NVSM in response to the comparison.

26 Claims, 5 Drawing Sheets

(56) References Cited

U.S. PATENT DOCUMENTS

| | | | |
|---|---|---|---|
| 6,429,990 B2 | 8/2002 | Serrano et al. | |
| 6,437,935 B1 | 8/2002 | Johnson et al. | |
| 6,614,616 B1 * | 9/2003 | Michel et al. | 360/78.04 |
| 6,661,591 B1 | 12/2003 | Rothberg | |
| 6,662,267 B2 | 12/2003 | Stewart | |
| 6,687,850 B1 | 2/2004 | Rothberg | |
| 6,725,397 B1 | 4/2004 | Emberty et al. | |
| 6,732,241 B2 * | 5/2004 | Riedel | 711/154 |
| 6,754,021 B2 | 6/2004 | Kisaka et al. | |
| 6,798,599 B2 | 9/2004 | Dykes et al. | |
| 6,807,630 B2 | 10/2004 | Lay et al. | |
| 6,845,456 B1 | 1/2005 | Menezes et al. | |
| 6,856,556 B1 | 2/2005 | Hajeck | |
| 6,892,313 B1 | 5/2005 | Codilian et al. | |
| 6,909,574 B2 | 6/2005 | Aikawa et al. | |
| 6,928,518 B2 | 8/2005 | Talagala | |
| 6,968,450 B1 | 11/2005 | Rothberg et al. | |
| 7,003,620 B2 | 2/2006 | Avraham et al. | |
| 7,017,037 B2 | 3/2006 | Fortin et al. | |
| 7,028,174 B1 | 4/2006 | Atai-Azimi et al. | |
| 7,076,605 B1 | 7/2006 | Son | |
| 7,082,494 B1 | 7/2006 | Thelin et al. | |
| 7,107,444 B2 | 9/2006 | Fortin et al. | |
| 7,114,029 B1 | 9/2006 | Thelin | |
| 7,120,806 B1 | 10/2006 | Codilian et al. | |
| 7,126,857 B2 | 10/2006 | Hajeck | |
| 7,139,933 B2 | 11/2006 | Hsu et al. | |
| 7,142,385 B2 | 11/2006 | Shimotono et al. | |
| 7,206,948 B2 | 4/2007 | Brauer | |
| 7,231,198 B2 | 6/2007 | Loughran | |
| 7,254,721 B1 | 8/2007 | Tobias et al. | |
| 7,275,166 B2 | 9/2007 | Kaiju et al. | |
| 7,334,082 B2 | 2/2008 | Grover et al. | |
| 7,340,647 B2 | 3/2008 | Aasheim et al. | |
| 7,350,105 B2 | 3/2008 | Aasheim et al. | |
| 7,392,340 B1 | 6/2008 | Dang et al. | |
| 7,395,452 B2 | 7/2008 | Nicholson et al. | |
| 7,411,757 B2 | 8/2008 | Chu et al. | |
| 7,421,552 B2 | 9/2008 | Long | |
| 7,425,810 B2 | 9/2008 | Hobbet et al. | |
| 7,430,136 B2 | 9/2008 | Merry, Jr. et al. | |
| 7,447,807 B1 | 11/2008 | Merry et al. | |
| 7,461,202 B2 | 12/2008 | Forrer, Jr. et al. | |
| 7,468,854 B2 | 12/2008 | Yamashita et al. | |
| 7,472,222 B2 | 12/2008 | Auerbach et al. | |
| 7,477,477 B2 | 1/2009 | Maruchi et al. | |
| 7,483,234 B2 | 1/2009 | Shimozato | |
| 7,502,256 B2 | 3/2009 | Merry, Jr. et al. | |
| 7,509,441 B1 | 3/2009 | Merry et al. | |
| 7,509,471 B2 | 3/2009 | Gorobets | |
| 7,516,346 B2 | 4/2009 | Pinheiro et al. | |
| 7,552,347 B2 | 6/2009 | Schutte | |
| 7,596,643 B2 | 9/2009 | Merry, Jr. et al. | |
| 7,610,438 B2 | 10/2009 | Lee et al. | |
| 7,610,445 B1 | 10/2009 | Manus et al. | |
| 7,613,876 B2 | 11/2009 | Bruce et al. | |
| 7,620,773 B2 | 11/2009 | Nicholson et al. | |
| 7,644,231 B2 | 1/2010 | Recio et al. | |
| 7,647,513 B2 | 1/2010 | Tobias et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,360 B1 | 3/2010 | Brunnett et al. | |
| 7,685,374 B2 | 3/2010 | Diggs et al. | |
| 7,698,586 B2 | 4/2010 | Kim et al. | |
| 7,719,785 B2 | 5/2010 | Taniguchi et al. | |
| 7,733,712 B1 | 6/2010 | Walston et al. | |
| 7,752,491 B1 | 7/2010 | Liikanen et al. | |
| 7,765,373 B1 | 7/2010 | Merry et al. | |
| 7,774,556 B2 * | 8/2010 | Karamcheti et al. | 711/146 |
| 7,797,487 B2 | 9/2010 | Lubbers et al. | |
| 7,817,372 B2 | 10/2010 | Takahashi | |
| 7,835,104 B2 | 11/2010 | Yamashita et al. | |
| 7,890,696 B2 | 2/2011 | Lawson | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 7,984,259 B1 | 7/2011 | English | |
| 8,060,707 B2 | 11/2011 | Fairhurst et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,098,451 B2 | 1/2012 | Graef | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,139,307 B2 | 3/2012 | Kim et al. | |
| 8,151,020 B2 | 4/2012 | Merry, Jr. et al. | |
| 8,161,227 B2 | 4/2012 | Diggs et al. | |
| 8,166,245 B2 | 4/2012 | Diggs et al. | |
| 8,169,726 B2 | 5/2012 | Wilson | |
| 8,243,525 B1 | 8/2012 | Kan | |
| 8,244,975 B2 | 8/2012 | DeCenzo | |
| 8,245,003 B2 | 8/2012 | Suzuki et al. | |
| 8,254,172 B1 | 8/2012 | Kan | |
| 8,261,012 B2 | 9/2012 | Kan | |
| 8,286,018 B2 | 10/2012 | Chang et al. | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,644 B2 | 12/2013 | Kumasawa et al. | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,501 B2 | 5/2014 | Flynn et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,773,802 B1 | 7/2014 | Anderson et al. | |
| 8,775,720 B1 | 7/2014 | Meyer et al. | |
| 8,782,327 B1 | 7/2014 | Kang et al. | |
| 8,782,334 B1 | 7/2014 | Boyle et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 2002/0083264 A1 | 6/2002 | Coulson | |
| 2003/0140198 A1 | 7/2003 | Ninose et al. | |
| 2003/0145167 A1 | 7/2003 | Tomita | |
| 2005/0108473 A1 | 5/2005 | Le Moal et al. | |

(56) References Cited

U.S. PATENT DOCUMENTS

| | | |
|---|---|---|
| 2005/0120251 A1 | 6/2005 | Fukumori |
| 2006/0075185 A1 | 4/2006 | Azzarito et al. |
| 2006/0195657 A1 | 8/2006 | Tien et al. |
| 2007/0006021 A1 | 1/2007 | Nicholson et al. |
| 2007/0050540 A1* | 3/2007 | Klein .......................... 711/113 |
| 2007/0162693 A1 | 7/2007 | Nam |
| 2008/0024899 A1 | 1/2008 | Chu et al. |
| 2008/0040537 A1 | 2/2008 | Kim |
| 2008/0049354 A1 | 2/2008 | Nitta |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1 | 9/2008 | Nam et al. |
| 2008/0256287 A1 | 10/2008 | Lee et al. |
| 2008/0288714 A1 | 11/2008 | Salomon et al. |
| 2008/0307270 A1 | 12/2008 | Li |
| 2009/0019218 A1 | 1/2009 | Sinclair et al. |
| 2009/0024793 A1 | 1/2009 | Fontenot et al. |
| 2009/0031072 A1 | 1/2009 | Sartore |
| 2009/0089501 A1 | 4/2009 | Ahn et al. |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172249 A1 | 7/2009 | Matthews |
| 2009/0172324 A1 | 7/2009 | Han et al. |
| 2009/0172499 A1 | 7/2009 | Olbrich et al. |
| 2009/0198940 A1 | 8/2009 | Ash et al. |
| 2009/0213486 A1 | 8/2009 | Takahashi |
| 2009/0249168 A1 | 10/2009 | Inoue |
| 2009/0271562 A1 | 10/2009 | Sinclair |
| 2009/0327603 A1 | 12/2009 | McKean et al. |
| 2010/0067138 A1 | 3/2010 | Ooi et al. |
| 2010/0088459 A1 | 4/2010 | Arya et al. |
| 2010/0122030 A1 | 5/2010 | Peters et al. |
| 2010/0169541 A1* | 7/2010 | Freikorn ....................... 711/103 |
| 2010/0174849 A1 | 7/2010 | Walston et al. |
| 2010/0191922 A1* | 7/2010 | Dickey et al. ................. 711/154 |
| 2010/0195243 A1 | 8/2010 | Zhu et al. |
| 2010/0250793 A1 | 9/2010 | Syu |
| 2010/0325352 A1 | 12/2010 | Schuette et al. |
| 2011/0010490 A1 | 1/2011 | Kwon et al. |
| 2011/0099323 A1 | 4/2011 | Syu |
| 2011/0106804 A1 | 5/2011 | Keeler et al. |
| 2011/0283049 A1 | 11/2011 | Kang et al. |
| 2011/0283128 A1 | 11/2011 | Farhan et al. |
| 2012/0170435 A1 | 7/2012 | Trantham |
| 2012/0260020 A1 | 10/2012 | Suryabudi et al. |
| 2012/0278531 A1 | 11/2012 | Horn |
| 2012/0284460 A1 | 11/2012 | Guda |
| 2012/0290779 A1 | 11/2012 | Eleftheriou et al. |
| 2012/0317338 A1 | 12/2012 | Yi et al. |
| 2012/0324191 A1 | 12/2012 | Strange et al. |
| 2013/0024650 A1 | 1/2013 | Ambat et al. |
| 2013/0117520 A1 | 5/2013 | Ryu |
| 2013/0132638 A1 | 5/2013 | Horn et al. |
| 2013/0145106 A1 | 6/2013 | Kan |
| 2013/0173850 A1 | 7/2013 | Song |
| 2013/0290668 A1 | 10/2013 | Na |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

DongKyu Lee; Koh, K.; "PDC-NH: Popular data concentration on NAND flash and hard disk drive," 2009 10thIEEE/ACM International Conference on Grid Computing, pp. 196-200, Oct. 13-15, 2009.

Boyle, et. al., U.S. Appl. No. 12/824,959, filed Jun. 28, 2010, 21 pages.

\* cited by examiner

US 9,058,280 B1

HYBRID DRIVE MIGRATING DATA FROM DISK TO NON-VOLATILE SEMICONDUCTOR MEMORY BASED ON ACCUMULATED ACCESS TIME

CROSS-REFERENCE TO RELATED APPLICATIONS

The present application claims priority from provisional U.S. Patent Application Ser. No. 61/373,753, filed on Aug. 13, 2010, the specification of which is incorporated herein by reference.

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figures 1A, 1B:
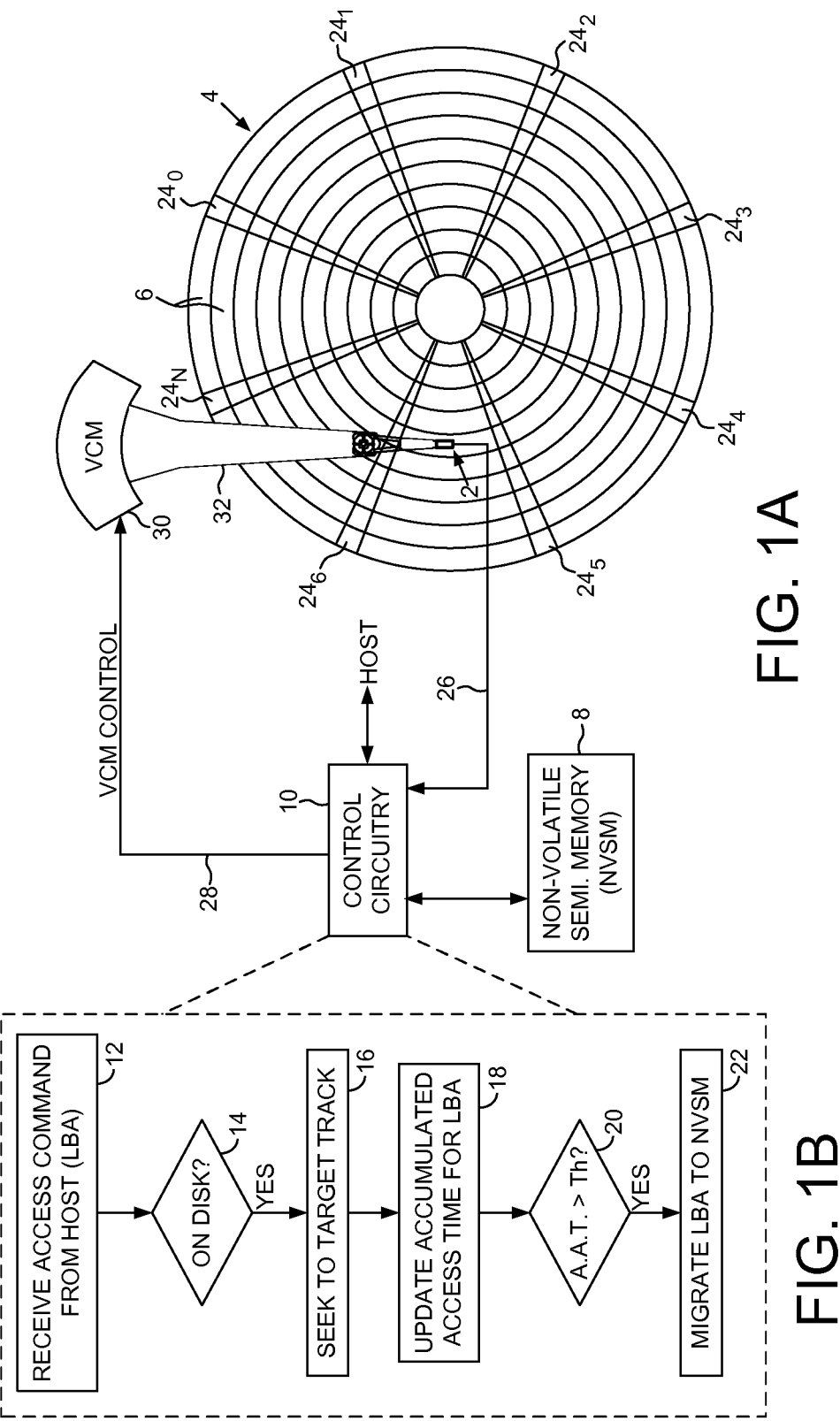
FIG. 1A shows a disk drive according to an embodiment of the present invention comprising a head actuated over disk, and a non-volatile semiconductor memory (NVSM).
FIG. 1B is a flow diagram according to an embodiment of the present invention wherein a seek time is accumulated for a target LBA mapped to the disk, and when the accumulated seek time exceeds a threshold, the target LBA is migrated to the NVSM.

FIG. 1A shows a hybrid drive comprising a head 2 actuated over a disk 4 comprising a plurality of data tracks 6, and a non-volatile semiconductor memory (NVSM) 8. The hybrid drive further comprises control circuitry 10 operable to execute the flow diagram of FIG. 1B wherein an access command is received from a host (step 12), the access command identifying at least one target logical block address (LBA). When the target LBA is mapped to a target data track on the disk (step 14), the head is positioned over the target data track (step 16) and an accumulated access time is updated for the target LBA (step 18). The accumulated access time is compared to a first threshold (step 20), and the target LBA is migrated to the NVSM in response to the comparison (step 22).

In the embodiment of FIG. 1A, the disk 4 comprises embedded servo sectors $24_0$-$24_N$ that define the data tracks 6. The control circuitry 10 processes a read signal 26 emanating from the head 2 to demodulate the servo sectors $24_0$-$24_N$ and generate a position error signal (PES) representing an error between the actual position of the head and a target position relative to a target track. The control circuitry 10 filters the PES using a suitable compensation filter to generate a control signal 28 applied to a voice coil motor (VCM) 30 which rotates an actuator arm 32 about a pivot in order to actuate the head 2 radially over the disk in a direction that reduces the PES.

Any suitable NVSM 8 may be employed in the embodiments of the present invention such as a suitable flash memory. In one embodiment, the NVSM 8 comprises a plurality of blocks, wherein each block comprises a plurality of memory segments referred to as pages, and each page may store one or more data sectors. The blocks are programmed a page at a time, and an entire block is erased in a unitary operation. The NVSM 8 typically provides better performance because it avoids the access latency of the disk (seek and rotational latency). However, since the capacity of the NVSM 8 is limited, in one embodiment the data migrated from the disk 4 to the NVSM 8 is selected based on the accumulated access time for the data.

Figure 2:
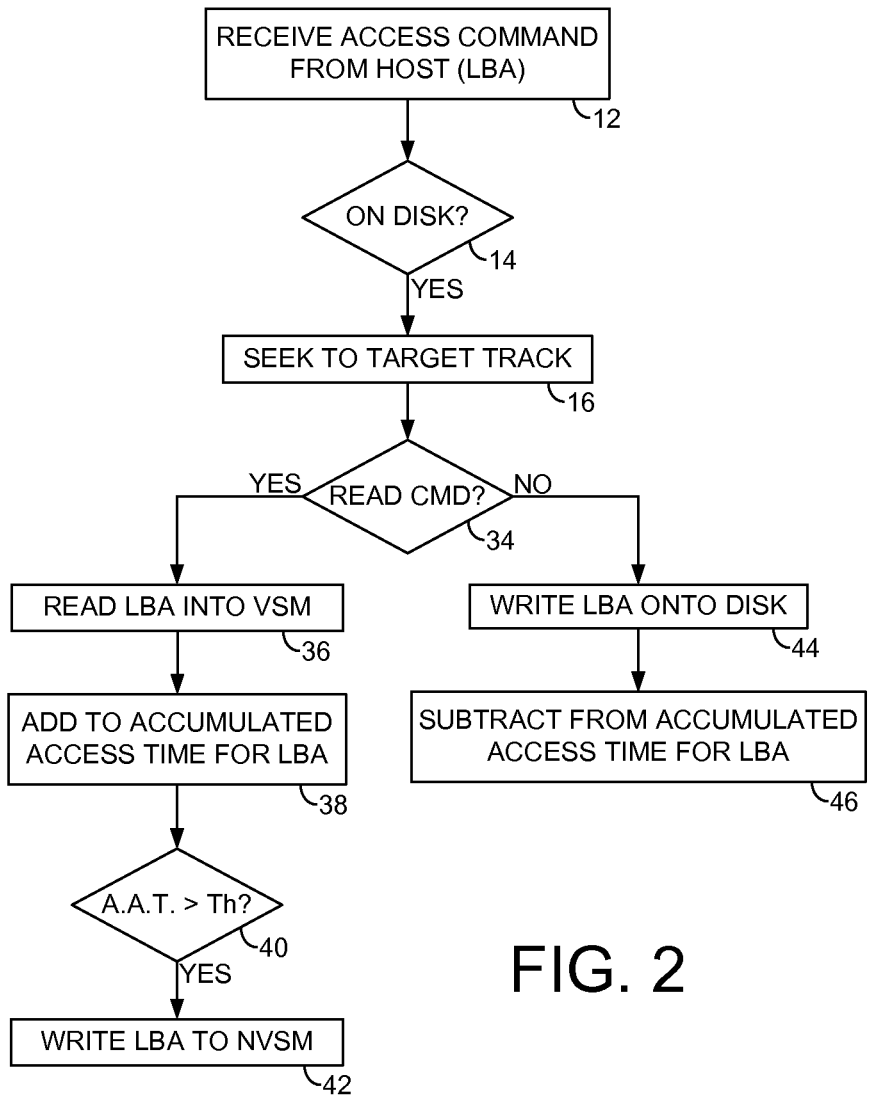
FIG. 2 is a flow diagram according to an embodiment of the present invention wherein the accumulated access time is decreased when the target LBA is written.

In one embodiment, there is a limit to the number of times the blocks of the NVSM may be programmed and erased (referred to as endurance). When the NVSM reaches the limit of program/erase cycles it essentially reaches end of life (for subsequent write operations). Accordingly, in one embodiment of the present invention the accumulated access time is biased based on the frequency that the data is written to the disk such that frequently written data is less likely to be migrated to the NVSM. This embodiment is understood with reference to the flow diagram of FIG. 2 wherein when the access command received from the host (step 12) is a read command (step 34), the data for the LBA is read from the disk (step 36) and the accumulated access time adjusted by a first value (step 38). If the accumulated access time exceeds a threshold (step 40), then the data is migrated (written) to the NVSM and the LBA mapping updated to reflect the migration (step 42). If the access command received from the host is a write command (step 34), then the data for the LBA is written to the disk (step 44) and the accumulated access time adjusted by a second value less than the first value (step 46). In the embodiment of FIG. 2, the second value decreases the accumulated access time (step 46) which reduces the likelihood that the data will be migrated to the NVSM.

Figure 3:
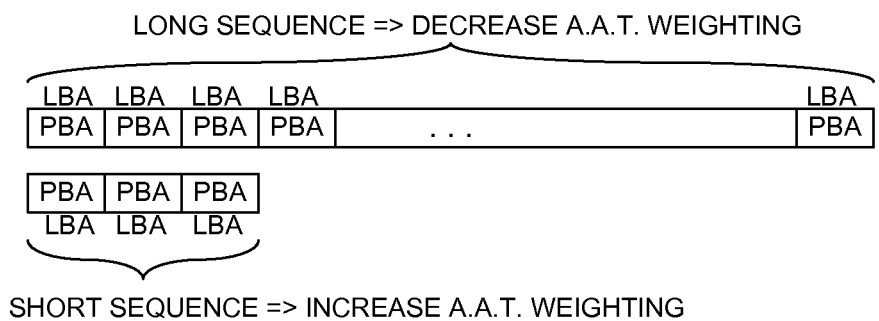
FIG. 3 shows an embodiment of the present invention wherein the accumulated access time is biased in response to a number of consecutive LBAs in an access command.

Other factors may bias the accumulated access time, or bias the threshold, or otherwise bias the comparison that determines whether to migrate data from the disk to the NVSM. FIG. 3 shows an embodiment of the present invention wherein the control circuitry maps the LBAs of an access command to physical block addresses (PBAs) representing data sectors in the target data track. The comparison for migrating the data is biased in response to a number of consecutive PBAs so as to reduce the likelihood of migrating the data of long consecutive PBAs to the NVSM. In the example of FIG. 3, the accumulated access time is decreased (lesser weighting) for longer sequences of PBAs and increased (higher weighting) for shorter sequences of PBAs. In one embodiment, the disk provides better performance when accessing long sequences of PBAs so there is less benefit of migrating long sequences of PBAs to the NVSM.

In one embodiment, an accumulated access time is maintained for each LBA and updated each time the LBA is accessed, and in one embodiment the degree to which the accumulated access time is adjusted is based on the access time for the current access command (which is based on the seek and rotational latency for the current access command). Referring again to the example of FIG. 3, when the first three LBAs are accessed as part of a long sequence, the accumulated access time for each LBA is adjusted by a first value (e.g., the access time divided by the total number of LBAs in the sequence), and when the first three LBAs are accessed as part of a shorter sequence, the accumulated access time for each LBA is adjusted by a second value greater than the first value (e.g., the access time divided by the lesser number of LBAs in the shorter sequence). In one embodiment, the first value may be a negative value so that the accumulated access time is reduced when an LBA is accessed as part of a long consecutive sequence of PBAs.

Figure 4A:
FIG. 4A shows an embodiment of the present invention wherein an accumulated access time is maintained for a plurality of LBA ranges, wherein an LBA ranges is migrated to the NVSM when its accumulated access time exceeds a threshold.
Figure 4B:
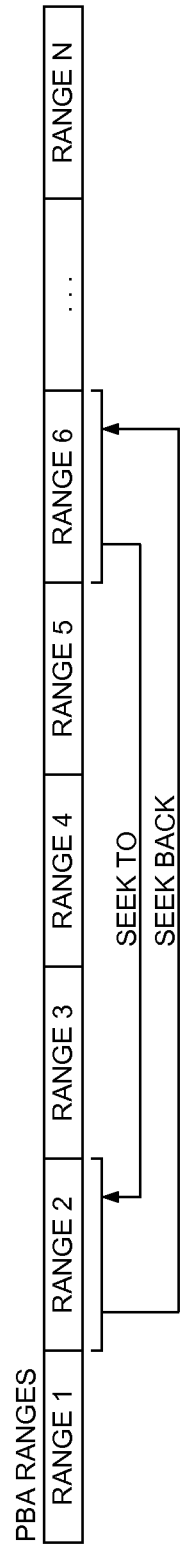
FIG. 4B shows an embodiment of the present invention wherein the accumulated access time is biased based on the length of seeks (within an LBA range or between LBA ranges).
Figure 5:
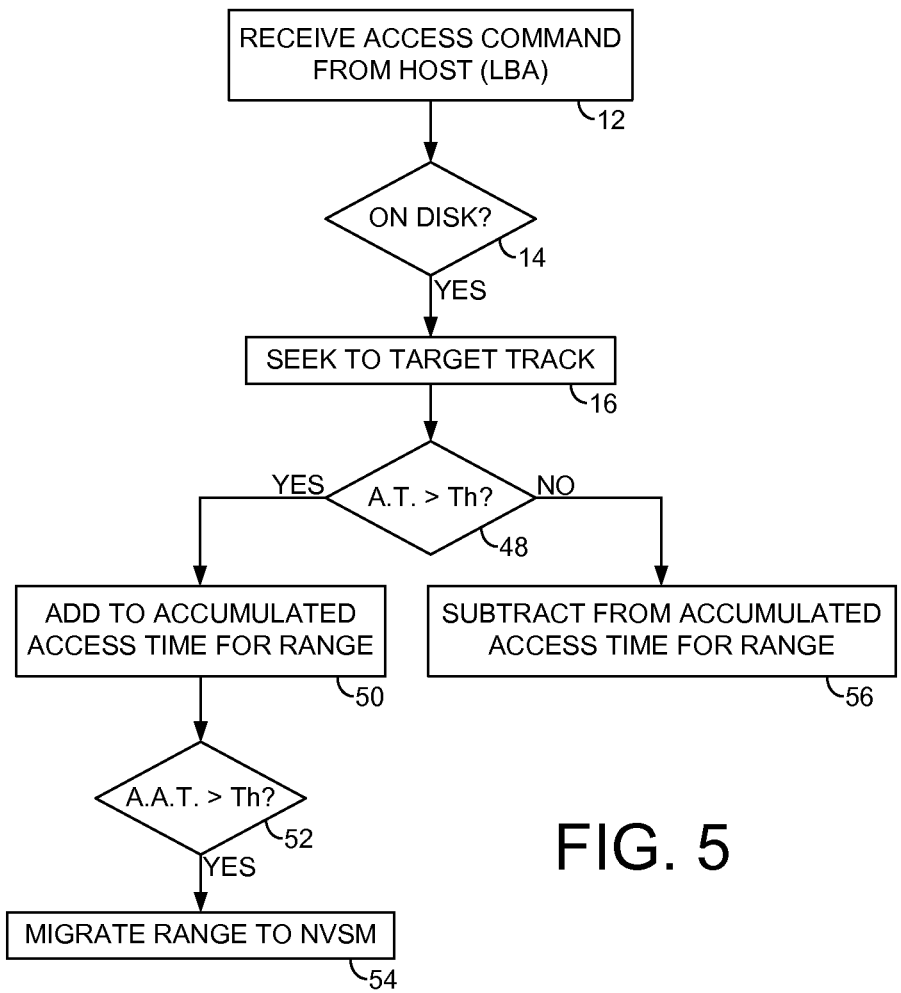
FIG. 5 is a flow diagram according to an embodiment of the present invention wherein when the access time of single access command is less than a threshold (short seek), the accumulated access time is decreased to reduce the chance of migrating the LBA to the NVSM.

FIG. 4A shows an embodiment of the present invention wherein a plurality of PBA ranges are defined, and each PBA range spans a plurality of consecutive PBAs. An accumulated access time is maintained for each PBA range, and when the accumulated access time exceeds a threshold, the LBAs assigned to the entire PBA range are migrated to the NVSM. In one embodiment, the accumulated access time is increased slower or even decreased the longer the head remains within a PBA range. This embodiment is understood with reference to the flow diagram of FIG. 5 in view of FIG. 4B. When an access command is received from the host (step 12) and the access time is greater than a threshold (step 48) (e.g., due to a long seek from PBA range 2 to PBA range 6 of FIG. 4B), the accumulated access time for the target PBA range is increased (step 50). If the accumulated access time for the PBA range exceeds a threshold (step 52), the LBAs mapped to the PBA range are migrated to the NVSM (step 54). If the access time is less than the threshold (step 48) (e.g., due to a short seek within the same PBA range), the accumulated access time for the target PBA range is decreased (step 56) thereby reducing the likelihood of migration to the NVSM. Referring again to FIG. 4B, if the head remains within PBA range 2 for an extended period but periodically seeks to PBA range 6 and then back to PBA range 2, the accumulated access time for PBA range 6 will eventually exceed the migration threshold. After migrating the LBAs mapped to PBA range 6 to the NVSM, the seeks to PBA range 6 are avoided thereby increasing the performance of the hybrid drive.

In one embodiment, the hybrid drive employs static LBA mapping wherein each LBA remains statically mapped to a corresponding PBA of the disk (unless a data sector is relocated due to a grown defect). In another embodiment, the hybrid drive employs dynamic LBA mapping (log structured) wherein the LBAs are mapped to different PBAs during each write operation. For example, dynamic LBA mapping may employ a circular buffer on the disk wherein the LBAs of a new write command are mapped to the PBAs corresponding to the head of the circular buffer. In this manner, a seek to a target data track may be needed to read previously written LBAs but not to service a new write command if the head is already located at the head of the circular buffer. In one embodiment, the PBA ranges shown in FIG. 4A correspond to sections of the same circular buffer. In an alternative embodiment, the PBA ranges shown in FIG. 4A each correspond to a different circular buffer, wherein an LBA range is assigned to each circular buffer.

In one embodiment, after migrating an LBA (or LBAs of a PBA range) to the NVSM, the control circuitry tracks how frequently the migrated LBAs are accessed. When the access frequency of a migrated LBA falls below a threshold, the control circuitry migrates the LBA (or LBAs) back to the disk in order to free space in the NVSM.

Figure 6:
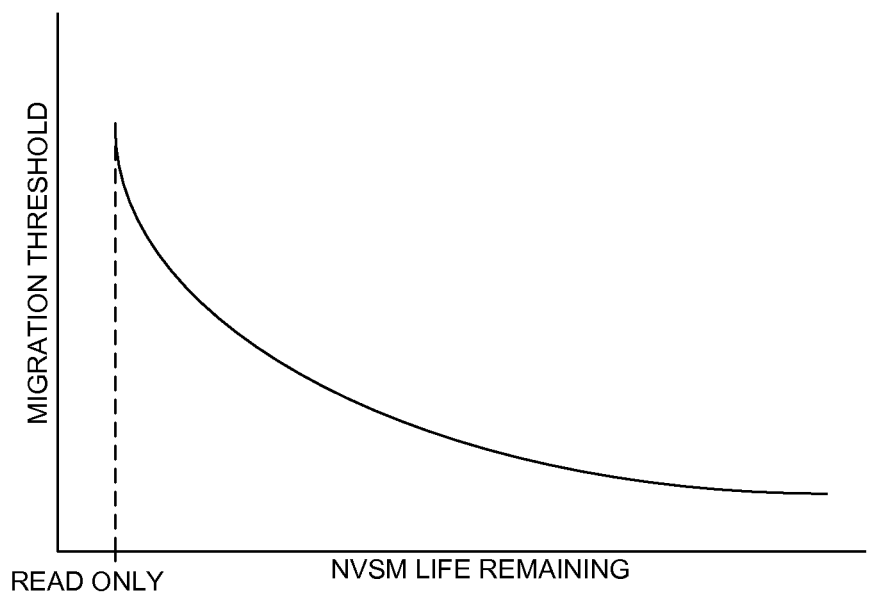
FIG. 6 shows an embodiment of the present invention wherein the migration threshold is increased as the life remaining of the NVSM decreases.

FIG. 6 shows an embodiment of the present invention wherein the migration threshold is increased as the life remaining of the NVSM decreases (due to the number of program/erase cycles increasing). This embodiment biases the comparison of the accumulated access time so as to reduce the likelihood of migration as the life remaining of the NVSM decreases, thereby extending the life of the NVSM by reducing write amplification.

Figure 7:
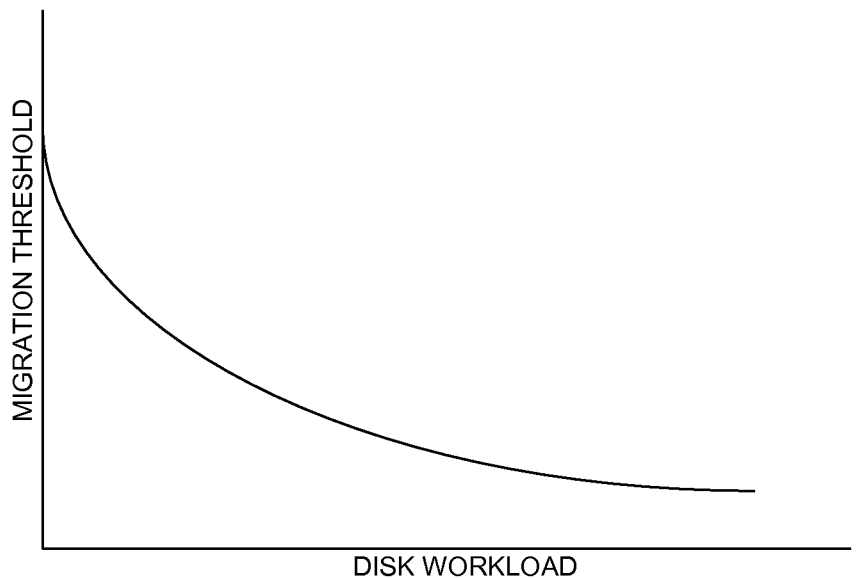
FIG. 7 shows an embodiment of the present invention wherein the migration threshold is decreased as the disk workload increases.

FIG. 7 shows an embodiment of the present invention wherein the migration threshold is decreased as the workload of disk access commands increases. This embodiment biases the comparison of the accumulated access time so as to increase the likelihood of migration when the disk workload increases. The disk workload may be determined in any suitable manner, such as by evaluating the frequency of access commands or an estimated execution time for the access commands pending in a disk command queue.

Figure 8:
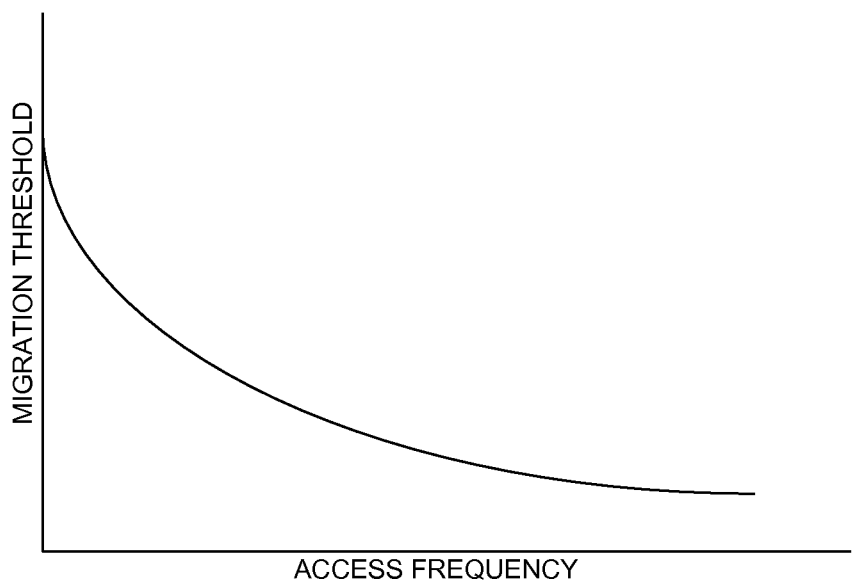
FIG. 8 shows an embodiment of the present invention wherein the migration threshold is decreased as an access frequency of the target LBA increases.

FIG. 8 shows an embodiment of the present invention wherein the migration threshold is decreased as an access frequency of a target LBA increases. This embodiment biases the comparison of the accumulated access time so as to increase the likelihood of migration when a particular LBA is accessed frequently relative to a predetermined number of consecutive access commands. If an LBA is accessed infrequently, there is less performance benefit derived from migrating the LBA to the NVSM.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
   a disk comprising a plurality of data tracks;
   a head actuated over the disk;
   a non-volatile semiconductor memory (NVSM); and
   control circuitry programmed to:
      receive an access command from a host, the access command identifying at least one target logical block address (LBA);
      when the target LBA is mapped to a target data track on the disk, seek the head to the target data track and update an accumulated access time for the target LBA based at least in part on a latency of the seek;
      compare the accumulated access time to a first threshold;
      migrate the target LBA to the NVSM in response to the comparison;
      adjust the accumulated access time by a first value for read commands; and
      adjust the accumulated access time by a second value for write commands;
      wherein the first value is greater than the second value.

2. The hybrid drive as recited in claim 1, wherein the first value increases the accumulated access time and the second value decreases the accumulated access time.

3. The hybrid drive as recited in claim 1, wherein when the access command comprises a read command, the control circuitry is further programmed to:
   execute the read command by reading data from the target data track; and
   migrate the target LBA to the NVSM by writing the data to the NVSM.

4. The hybrid drive as recited in claim 1, wherein the control circuitry is further programmed to:
   map a plurality of LBAs of the access command to corresponding physical block addresses (PBAs) representing data sectors in the target data track; and
   adjust the accumulated access time in response to a number of consecutive PBAs.

5. The hybrid drive as recited in claim 1, wherein the control circuitry is further programmed to:
   map a plurality of LBAs of the access command to corresponding physical block addresses (PBAs) representing data sectors in the target data track; and
   bias the comparison in response to a number of consecutive PBAs.

6. The hybrid drive as recited in claim 1, wherein the control circuitry is further programmed to:
   map a plurality of LBAs of the access command to corresponding physical block addresses (PBAs) representing data sectors in the target data track;
   define a plurality of PBA ranges, wherein each PBA range spans a plurality of consecutive PBAs;
   maintain an accumulated access time for each PBA range; and
   when the accumulated access time of a first PBA range exceeds the first threshold, migrate the LBAs mapped to the PBAs of the first PBA range to the NVSM.

7. The hybrid drive as recited in claim 1, wherein the control circuitry is further programmed to:
   generate an access time for the target LBA of the access command;
   when the access time is greater than a second threshold, adjust the accumulated access time by a first value; and
   when the access time is less than the second threshold, adjust the accumulated access time by a second value;
   wherein the first value is greater than the second value.

8. The hybrid drive as recited in claim 7, wherein the first value increases the accumulated access time and the second value decreases the accumulated access time.

9. The hybrid drive as recited in claim 1, wherein the control circuitry is further programmed to bias the comparison in response to a life remaining of the NVSM decreasing.

10. The hybrid drive as recited in claim 1, wherein the control circuitry is further programmed to bias the comparison in response to a workload of disk access commands.

11. The hybrid drive as recited in claim 1, wherein the control circuitry is further programmed to bias the comparison in response to an access frequency of the target LBA.

12. A method of operating a hybrid drive comprising a head actuated over a disk comprising a plurality of data tracks, and a non-volatile semiconductor memory (NVSM), the method comprising:
   receiving an access command from a host, the access command identifying at least one target logical block address (LBA);
   when the target LBA is mapped to a target data track on the disk, seeking the head to the target data track and updating an accumulated access time for the target LBA based at least in part on a latency of the seeking;
   comparing the accumulated access time to a first threshold;
   migrating the target LBA to the NVSM in response to the comparison;
   adjusting the accumulated access time by a first value for read commands; and
   adjusting the accumulated access time by a second value for write commands;
   wherein the first value is greater than the second value.

13. The method as recited in claim 12, wherein the first value increases the accumulated access time and the second value decreases the accumulated access time.

14. The method as recited in claim 12, wherein when the access command comprises a read command, further comprising:
   executing the read command by reading data from the target data track; and
   migrating the target LBA to the NVSM by writing the data to the NVSM.

15. The method as recited in claim 12, further comprising:
   mapping a plurality of LBAs of the access command to corresponding physical block addresses (PBAs) representing data sectors in the target data track; and
   adjusting the accumulated access time in response to a number of consecutive PBAs.

16. The method as recited in claim 12, further comprising:
   mapping a plurality of LBAs of the access command to corresponding physical block addresses (PBAs) representing data sectors in the target data track; and
   biasing the comparison in response to a number of consecutive PBAs.

17. The method as recited in claim 12, further comprising:
   mapping a plurality of LBAs of the access command to corresponding physical block addresses (PBAs) representing data sectors in the target data track;

defining a plurality of PBA ranges, wherein each PBA range spans a plurality of consecutive PBAs;

maintaining an accumulated access time for each PBA range; and when the accumulated access time of a first PBA range exceeds the first threshold, migrating the LBAs mapped to the PBAs of the first PBA range to the NVSM.

18. The method as recited in claim 12, further comprising:

generating an access time for the target LBA of the access command;

when the access time is greater than a second threshold, adjusting the accumulated access time by a first value; and when the access time is less than the second threshold, adjusting the accumulated access time by a second value;

wherein the first value is greater than the second value.

19. The method as recited in claim 18, wherein the first value increases the accumulated access time and the second value decreases the accumulated access time.

20. The method as recited in claim 12, further comprising biasing the comparison in response to a life remaining of the NVSM decreasing.

21. The method as recited in claim 12, further comprising biasing the comparison in response to a workload of disk access commands.

22. The method as recited in claim 12, further comprising biasing the comparison in response to an access frequency of the target LBA.

23. A hybrid drive comprising:

a disk comprising a plurality of data tracks;

a head actuated over the disk;

a non-volatile semiconductor memory (NVSM); and control circuitry programmed to:

receive an access command from a host, the access command identifying at least one target logical block address (LBA);

when the target LBA is mapped to a target data track on the disk, seek the head to the target data track and update an accumulated access time for the target LBA based at least in part on a latency of the seek;

compare the accumulated access time to a first threshold;

migrate the target LBA to the NVSM in response to the comparison;

map a plurality of LBAs of the access command to corresponding physical block addresses (PBAs) representing data sectors in the target data track; and adjust the accumulated access time in response to a number of consecutive PBAs.

24. A hybrid drive comprising:

a disk comprising a plurality of data tracks;

a head actuated over the disk;

a non-volatile semiconductor memory (NVSM); and control circuitry programmed to:

receive an access command from a host, the access command identifying at least one target logical block address (LBA);

when the target LBA is mapped to a target data track on the disk, seek the head to the target data track and update an accumulated access time for the target LBA based at least in part on a latency of the seek;

compare the accumulated access time to a first threshold;

migrate the target LBA to the NVSM in response to the comparison; and bias the comparison in response to a workload of disk access commands.

25. A method of operating a hybrid drive comprising a head actuated over a disk comprising a plurality of data tracks, and a non-volatile semiconductor memory (NVSM), the method comprising:

receiving an access command from a host, the access command identifying at least one target logical block address (LBA);

when the target LBA is mapped to a target data track on the disk, seeking the head to the target data track and updating an accumulated access time for the target LBA based at least in part on a latency of the seeking;

comparing the accumulated access time to a first threshold;

migrating the target LBA to the NVSM in response to the comparison;

mapping a plurality of LBAs of the access command to corresponding physical block addresses (PBAs) representing data sectors in the target data track; and adjusting the accumulated access time in response to a number of consecutive PBAs.

26. A method of operating a hybrid drive comprising a head actuated over a disk comprising a plurality of data tracks, and a non-volatile semiconductor memory (NVSM), the method comprising:

receiving an access command from a host, the access command identifying at least one target logical block address (LBA);

when the target LBA is mapped to a target data track on the disk, seeking the head to the target data track and updating an accumulated access time for the target LBA based at least in part on a latency of the seeking;

comparing the accumulated access time to a first threshold;

migrating the target LBA to the NVSM in response to the comparison; and biasing the comparison in response to a workload of disk access commands.

* * * * *